May 19, 1964 — J. J. O'BARSKI — 3,133,749

FOOT REST ATTACHMENT FOR BICYCLES

Filed Aug. 13, 1962

INVENTOR.
JOSEPH J. O'BARSKI

United States Patent Office 3,133,749
Patented May 19, 1964

3,133,749
FOOT REST ATTACHMENT FOR BICYCLES
Joseph J. O'Barski, 8200 Marquette Ave., Chicago 17, Ill.
Filed Aug. 13, 1962, Ser. No. 216,381
1 Claim. (Cl. 280—291)

This invention relates generally to foot rest devices for bicycles and more particularly relates to an improved foot rest device of the character described having a foot support member which is removably secured to the means provided for mounting said device on the bicycle in position for convenient use by a passenger being carried on the bicycle.

Heretofore, foot rest devices of the general character with which the invention is concerned have utilized foot support elements which were permanent in their securement to the foot rest device. Consequently, when it was desired not to have the foot support member protruding laterally from the bicycle, it was necessary to remove the entire device from the bicycle, where such a removable installation of the device was employed. Since many of these foot rest devices utilized rather involved means for mounting them on the bicycle or required the bicycle to be supported in inverted position so that the mounting means could be unfastened from the bicycle, it was not convenient to remove the devices when not used. Young children also were without sufficient skill to successfully install or remove the foot rest device. Consequently, once installed, the device remained on the bicycle with the foot support member protruding laterally outwardly in position to possibly inflict damage upon anyone coming in contact therewith inadvertently during riding of the bicycle.

Further, use of such prior devices were limited as to the location on the bicycle where they could be installed. For instance, many devices could be used only at the front or at the rear end of the bicycle, but not at either end. Also, they could be used only on one side, that is, either on the right or left side of the bicycle, and not on either or both sides selectively. Such prior devices also were not capable of substantially universal use on most models of bicycles because of the special means employed for mounting the devices which adapted them for use only on one or a limited number of bicycle models. In addition, prior devices were relatively expensive to manufacture hence their more universal use was discouraged. Consequently, where a passenger was carried on the familiar bicycle, his legs would hang loosely down unless purposely held outwardly to avoid becoming enmeshed with the spokes of a bicycle wheel. This position of the passenger on the bicycle was precarious since he had no support for his legs to provide for better balance on the bicycle, especially during rapid turns.

Accordingly, it is a major object of the invention to provide a foot rest device of the character described for use on bicycles which is characterized by a construction capable of substantially eliminating the disadvantages hereinabove enumerated, as well as others.

An important object of the invention is to provide a foot rest attachment for bicycles having mounting means for removably installing said device at either the front or rear end of the bicycle and on either side thereof and a foot support member removably secured to said mounting means so that the foot support member can be separated from the mounting means without requiring the entire device to be removed from the bicycle.

Another important object of the invention is to provide a foot rest device of the character described in which said mounting means comprises a pair of plate members bolted together at opposite ends thereof and said foot support member comprises, an elongate, rigid element threadedly engaged with one of said plate members and extending outwardly therefrom in normal foot supporting position.

Another object of the invention is to provide a foot device of the character described which can be used substantially universally on most models of bicycles either on the front or rear end of the bicycle frame and on either side thereof.

Other objects of the invention are to provide a foot rest device of the character described which is economical to manufacture, which is simple and easy to install, and which is durable and strong.

The foregoing and other objects of the invention will become apparent as the description thereof ensues in which a preferred embodiment has been described in detail in the specification and illustrated in the accompanying drawing. It is contemplated that minor variations in the size, arrangement, construction and proportion of the several parts thereof may occur to the skilled artisan without departing from the scope or sacrificing any of the advantages of the invention.

Figure 1:
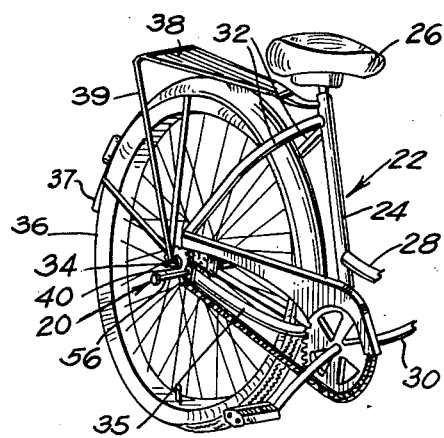
FIG. 1 is a fragmentary perspective view showing the rear end of a conventional bicycle having the foot rest device embodying the invention installed thereon.

Referring now to the drawing, the reference character 20 designates generally the foot rest device embodying the invention. The device 20 is shown installed on a bicycle only partially illustrated in FIG. 1 and specifically on a rear end portion of the bicycle frame identified generally by the reference character 22. The tubular frame member 24 which is vertically oriented mounts a bicycle seat 26 at the upper end thereof upon which the rider sits to drive the bicycle. Extending from the standard 24 toward the front end of the bicycle may be a pair of transverse frame members 28 and 30 which connect to a forked section (not shown) of the bicycle frame 22 upon which the front wheel of the bicycle is journalled. Extending downwardly and rearwardly from adjacent the top end of the standard 24 is a forked brace 32 through which the shaft 34 is journalled. Extending rearwardly from the bottom end of the standard 24 is a second fork arrangement comprised of a pair of legs, such as the leg 35 seen in FIG. 1. The shaft 34 also is journalled in suitable bearing slots usually provided in each of the legs 35 and the rear wheel 36 of the bicycle is rotatably mounted on shaft 34 between the legs of the forked brace 32 and the legs 35 of the second forked brace.

The rear wheel 36 has a fender guard 37 around a portion of the circumference thereof and supported spaced above said guard 37 is a carrier member 38 secured at one end thereof to the standard 24 and rigidified by means of a pair of braces, such as brace 39 secured at the bottom end thereof on the shaft 34. The carrier member 38 is used in many ways, such as carrying a person thereon whose legs may straddle the rear end of the bicycle and hang downwardly usually in the vicinity of the shaft 34 on opposite sides of the wheel 36. Such a passenger on the bicycle must be extremely careful to keep his feet from becoming engaged with the spokes of the wheel 36 and to do this, the feet generally are spread away from the wheel. In other instances, a passenger may sit on carrier 38 side-saddle fashion so that both legs hang down on one side of the wheel 36.

Figure 2:
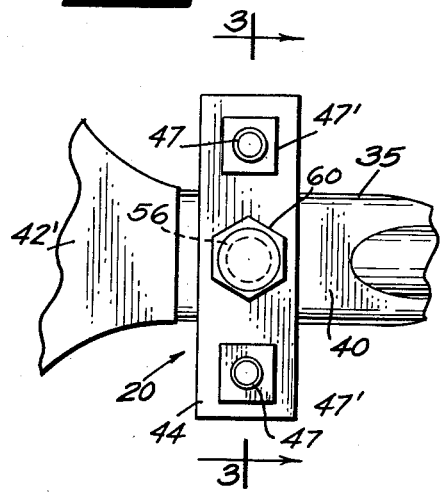
FIG. 2 is a top plan view showing said device installed on a portion of the bicycle frame.

The foot rest device 20 embodying the invention is shown mounted on a leg 35 of the second forked brace of the bicycle frame. As seen in FIG. 2, the leg 35 has a flattened portion 40 adjacent a widened end portion 42' thereof in which the shaft 34 usually is journalled. The device 20 preferably is secured on the flattened portion 40. Said device 20 has a pair of flat, metal plates 42 and 44 of substantially identical configuration and size. Each plate 42 and 44 is substantially rectangular in configuration, the plates cooperating to provide the means for mounting the device 20 on the flattened portion 40. Said plates are arranged on opposite sides of the portion 40 and in alignment one with the other. Each plate has transverse openings 46 therethrough adjacent opposite ends 48 thereof, each opening 46 in one of the plates being aligned with an opening 46 in the second plate. Headed bolts 47 are passed through the aligned openings 46 and held in place by nuts 47' threaded on the opposite protruding ends of the bolts. Thus, tightening of the bolts 47 draws the plates together to clamp the device 20 on the flattened portion 40 with the plates 42 and 44 arranged generally normal to the length of the leg 35.

Figure 3:
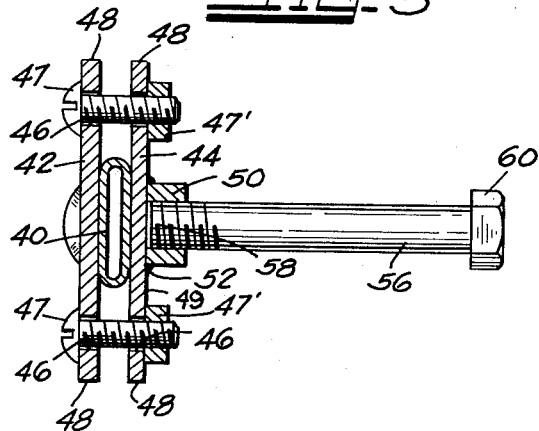
FIG. 3 is a fragmentary sectional view taken along the line 3—3 of FIG. 2 and in the general direction indicated.

In the installed condition of device 20, the plate 44 is located juxtaposed the outside surface of the portion 40 considered in relation to the wheel 34. Medially located between the opposite ends 48 of plate 44 and on the exterior surface 49 thereof is an outwardly extending, internally threaded boss formation 50, the axis of which is generally perpendicular to the plate 44. The boss formation 50 may be provided, for instance, by means of a suitable nut welded, such as indicated at 52, to the outside surface 49 of plate 44. Threadedly engaged in the formation 50 is an elongated stud 56, one end 58 of which is externally threaded and the opposite end of which has a head 60. The stud 56 may consist of a conventional carriage bolt, for instance, of suitable shank dimension to enable end 58 thereof to be screwed into the formation 50. As seen in FIG. 3, the stud 56 extends outwardly from the plate 44 at right angle thereto.

Figure 4:
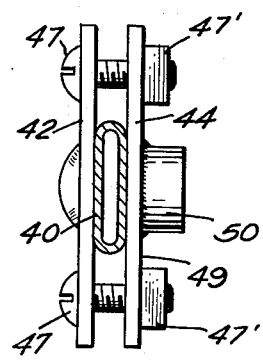
FIG. 4 is a sectional view similar to FIG. 3 and showing device with the foot support member removed.

Referring to FIG. 1, a passenger seated on the carrier member 38 can support a foot on the stud 56 with the head 60 also functioning to prevent the foot from sliding off the free end of the stud. A like device 20 may be mounted on the second leg 35 of the fork brace on the opposite side of the wheel 36 from that illustrated in FIG. 1. For persons having shorter legs, the device 20 can be mounted on either or both legs of the forked brace 32. When it is desired not to use the device, the stud 56 is unscrewed from the formation 50, as seen in FIG. 4, so that removal of the entire device 20 is not required. The device 20 can be used successfully by a passenger riding on carrier 38 either straddling the same or seated in side-saddle fashion thereon.

It will be understood that the device 20 is capable of being mounted on just about any suitable portion of the frame 22 of the bicycle, including on the fork braces usually provided for the front wheel of the bicycle or on either frame member 28 or 30. It has been deemed unnecessary to illustrate a device 20 mounted at the front end of the bicycle frame or elsewhere.

Since the plate 42 is juxtaposed the inside surface of the flattened portion 40 when the device 20 is mounted, it is noteworthy that there are no formations protruding sufficiently outwardly from the plate 42 so as to interfere with rotation of wheel 36, such as, coming in contact with the spokes of the wheel. The heads of bolts 47, seen in FIG. 3, do not protrude outwardly from the plate 42 sufficiently to reach the spokes of the wheel 36.

It will be appreciated that the construction of the device 20 is very economical since readily available component parts therefor are used. Thus, the bolts 47 and stud 50 are stock items and the plates 42 and 44 are made from economical sheet metal or metal bars. Although not shown, suitable plain washers and lock washers also may be used, especially lock washers for holding nuts 47' in place on the ends of the bolts 47.

It is believed that the invention has been described in sufficient detail to enable the skilled artisan to understand and practice the same. The invention has been pointed out distinctly in the claim hereto appended in language intended to be broadly construed commensurate with the progress in the arts and sciences contributed thereby.

What it is desired to secure by Letters Patent of the United States is:

A foot rest device for mounting on the frame of a bicycle comprising, a pair of flat clamping plates adapted to be clamped about a flat frame member of the bicycle adjacent the rear hub thereof, said plates being of substantially identical size and shape, adjustable fastener means extending through said plates for mounting said device on the frame, one of said plates having an internally threaded boss welded onto the exterior flat surface thereof, an elongated foot rest member, said member having one end threaded for removably securing the same within said threaded boss, and a foot retaining stop formed on the other end thereof, transverse to the longitudinal axis of said member.

References Cited in the file of this patent

UNITED STATES PATENTS

| | | |
|---|---|---|
| 516,902 | Smith | Mar. 20, 1894 |
| 625,368 | Thompson | May 23, 1899 |

FOREIGN PATENTS

| | | |
|---|---|---|
| 17,100 | Great Britain | of 1893 |
| 186,825 | Great Britain | Oct. 12, 1922 |
| 107,059 | Austria | Aug. 25, 1927 |
| 486,749 | Germany | Feb. 3, 1928 |